United States Patent [19]

Feucht

[11] 4,044,977
[45] Aug. 30, 1977

[54] BUSHING TYPE MOUNT WITH TRIPLE SPRING RATE

[75] Inventor: Dennis D. Feucht, Morton, Ill.

[73] Assignee: Caterpillar Tractor Co., Peoria, Ill.

[21] Appl. No.: 677,576

[22] Filed: Apr. 16, 1976

[51] Int. Cl.² .............................................. F16C 35/12
[52] U.S. Cl. .................................. 248/7; 248/358 R; 267/153
[58] Field of Search ................ 248/6, 7, 8, 9, 358 R, 248/358 AA, 22, 21, 26; 180/64; 267/153; 308/26

[56] References Cited

U.S. PATENT DOCUMENTS

| | | | |
|---|---|---|---|
| 2,245,295 | 6/1941 | Piron | 248/358 R X |
| 2,614,896 | 10/1952 | Pierce | 308/26 |
| 2,906,572 | 9/1959 | Wroby | 248/26 X |
| 3,140,901 | 7/1964 | Young | 308/26 |
| 3,306,679 | 2/1967 | Stokely | 308/26 |
| 3,704,922 | 12/1972 | Kleinschmidt | 308/26 |
| 3,743,365 | 7/1973 | Kato | 308/26 |

FOREIGN PATENT DOCUMENTS

| | | | |
|---|---|---|---|
| 1,251,719 | 12/1960 | France | 308/26 |
| 1,025,402 | 4/1966 | United Kingdom | 308/26 |
| 485,935 | 5/1938 | United Kingdom | 248/358 AA |

Primary Examiner—J. Franklin Foss
Attorney, Agent, or Firm—Phillips, Moore, Weissenberger, Lempio & Majestic

[57] ABSTRACT

An isolation mount is provided having triple spring rate capability. The mount provides a first spring rate to absorb and isolate engine shock and vibration to a first deflection limit and then a higher spring rate to a second deflection limit. If desired, a still higher spring rate above the second deflection limit is provided. The mount includes annular inner and outer bushings separated by an annular ring and a plurality of resilient supporting bushings. The ring and bushings are sized with respect to each other so that initial radial loading is taken by the plurality of resilient bushings until a first gap between the ring and the outer bushings is closed. This effectively removes the contribution of a pair of the resilient bushings to the spring rate. Thereafter, a further increase of the load will close a second gap between the ring and the inner bushing and effectively remove the remaining resilient bushing's contribution to the spring rate. The first spring rate is thus changed to a higher second spring rate. Thereafter, further deflection will result in a third spring rate higher than the second spring rate.

9 Claims, 6 Drawing Figures

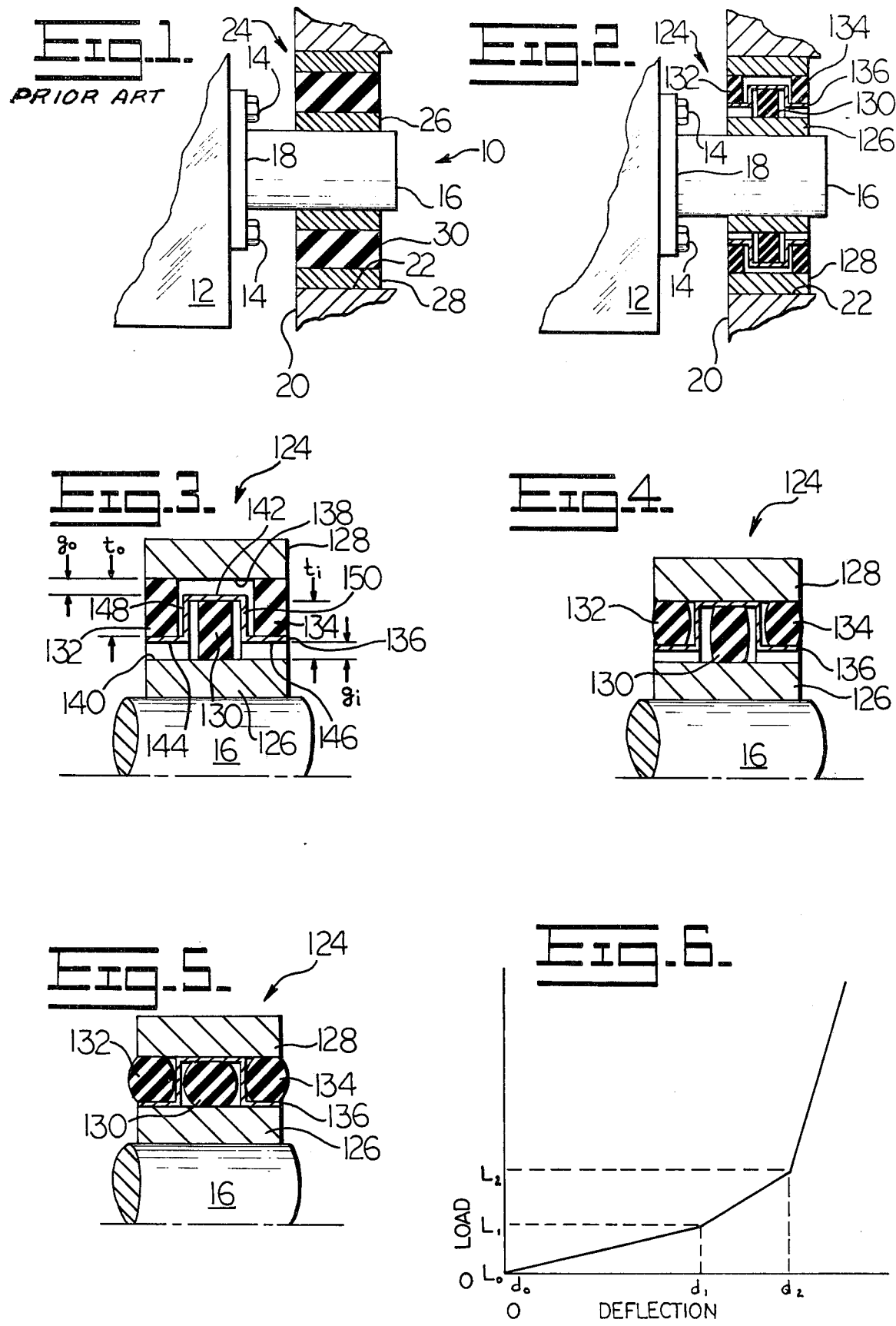

BUSHING TYPE MOUNT WITH TRIPLE SPRING RATE

BACKGROUND OF THE INVENTION

This invention relates to isolation mounts. More particularly, this invention relates to an isolation mount such as an engine mount providing a plurality of spring rates under various loading conditions imparted by an engine that is supported by the mount.

While the following discussion talks in terms of an engine mount such is by way of example only. It is to be understood that other applications for the described engine mount are also contemplated such as in rock drills, compressors, etc.

Currently, engines in various applications are mounted by means of relatively resilient shock mounts. These mounts are designed to have good isolation properties to minimize the transmission of vibration, etc., from the engine to a supporting structure, such as the vehicle frame. Currently, the mounts typically utilize a pair of outer and inner annular metal bushings having an annular resilient bushing of rubber material compressed therebetween. The inner bushing is fitted over a stub shaft which projects from the engine that is being supported. The outer bushing, in turn, is supported by a mount housing which may be typically fixed to a frame, such as a vehicle frame. A plurality of such mounts are used to support an engine.

An example of a prior art mount is shown in U.S. Pat. No. 3,770,231, assigned to the same Assignee hereof.

Current rubber shock mounts provide a single linear spring rate for deflections imposed thereon by engine operation. This is undesirable, in that while a relatively soft and linear spring rate is required for normal load conditions on the shock mount, shock loading can detrimentally affect the rubber mount material, causing fatigue failure. Thus, it is very desirable to have a double or even triple rate mount that would effectively: give a relatively soft linear spring rate for normal loads; and then respond with a higher or stiffer spring rate or rates when subjected to shock loads. In essence, what is desired is to have a double or even triple rate mount.

SUMMARY AND OBJECTS OF THE INVENTION

It is therefore the primary object of this invention to provide a shock mount which has a plurality of spring rates.

It is a further object of this invention to provide such a shock mount which provides increasing or stiffer spring rates to accommodate increasing loads imposed thereon.

It is a further object of this invention to provide such a shock mount which avoids fatigue failure of the resilient material thereof.

The invention takes the form of an engine mount having a pair of spaced, concentric annular metal bushings. A mounting ring contained within the bushings is normally spaced therefrom. The mounting ring is in turn supported by resilient bushings which are fixed as by bonding to the concentric bushings.

Other objects and advantages of this invention will become more readily apparent from a review of the following description and accompanying drawings.

BRIEF DESCRIPTION OF THE DRAWINGS

FIG. 1 is a fragmentary, cross-sectional view of a prior art engine mount, illustrating the details of construction thereof;

FIG. 2 is a similar view of the engine mount of the instant invention;

FIG. 3 is an enlarged partial, cross-sectional view of the engine mount of FIG. 2, illustrating the details thereof with the mount in its normal undeflected position;

FIG. 4 is a view similar to FIG. 3, however with the mount depressed as a result of being loaded so as to produce a second spring rate;

FIG. 5 is a view similar to FIGS. 3 and 4, with the mount further loaded so that a third spring rate is produced; and, FIG. 6 is a graphical representation of the mount load versus deflection, illustrating the spring rates of FIGS. 3, 4, and 5, respectively.

DETAILED DESCRIPTION

Turning to FIG. 1, there is shown a prior art engine mount 10, which is shown in combination with an engine shown partially at 12. Fixed to the side wall of the engine 12 by a means such as bolts 14 is a cylindrical stub shaft 16 extending horizontally from a vertically oriented base plate 18 to which it is fixed. The engine mount is in turn comprised of a housing 20 having a bore 22 located therein. Housing 20 is conveniently mounted to the vehicle frame by conventional means (not shown). Within the bore 22 is fitted a bushing assembly shown generally at 24. The bushing assembly is comprised of inner and outer concentric ring bushings 26,28, respectively, having a resilient bushing 30 fitted therebetween. The material of concentric bushings 26,28 may conveniently be metal material. The material of intermediate resilient bushing 30 may conveniently be rubber. This prior art engine mount is capable of only a single spring rate.

Turning to FIG. 2, there is shown a triple spring rate bushing, shown generally at 124, fitted within bore 22 in mount housing 20. This bushing or mounting means is comprised of annular or ring shaped inner and outer concentric bushings 126,128, respectively. These bushings may conveniently be of metal material, and are in spaced relation to each other. Within the annular space defined by the inner and outer bushings is a centrally disposed annular resilient bushing member 130. In addition, a pair of spaced apart annular bushing members 132,134, are also located within the annular space on opposite sides of the centrally disposed resilient bushing member 130. These resilient bushing members may be made of rubber or other resilient material.

Intermediate these bushing members is a mounting ring that will be more fully described hereinafter. The resilient bushings may be fixed or otherwise bonded to the inner and outer rings and the mounting ring.

Turning to FIG. 3, there is shown an enlarged view of a portion of the bushing 124. As shown in FIG. 3, the bushing is in its normal, unloaded configuration, with the pair of resilient outer bushings 132,134 of thickness $t_o$. Bushings 132,134 are contained between mounting ring 136 and radially innermost face 138 of outer bushing 128. Similarly, a centrally disposed resilient bushing 130 of thickness $t_i$ is connected between the radially outermost face 140 of inner bushing 126 and mounting ring 136.

Mounting ring 136 defines a radially outer portion 142 which is generally axially directed at a pair of generally axially directed radially inner portions or flanges 144,146, interconnected by radially directed sidewalls 148,150. The mounting ring may conveniently be of a metal material, such as sheet metal. It may be noted that in the normal, no-load condition shown in FIG. 3, a gap $g_o$ exists between inner face 138 and radially outer portion 142. In addition, a gap $g_i$ exists between radially outer face 140 and radially inner portions 144,146.

In operation, the bushing thus described will exhibit a linear spring rate primarily contributed by the resilient bushings 130,132 and 134 until a first limit of deflection is reached. The first limit of deflection may be seen in FIG. 4 wherein gap $g_o$ has closed. Turning to FIG. 6, this limit of deflection is best seen as $d_1$ for a load $l_1$ imposed upon the bushing. Beyond deflection $d_1$ and up to deflection $d_2$, the bushing will exhibit a second, steeper spring rate contributed to primarily by inner resilient bushing 130. This will continue until the inner gap $g_i$ has closed, as best seen in FIG. 5. Turning to FIG. 6, this condition of deflection is represented by deflection $d_2$ at a load $l_2$. Beyond this limit, the spring rate will be substantially contributed to by the mounting ring 136, which since it is of stiffer metal material will result in a relatively steep spring rate, as shown in FIG. 6. As thus described, the bushing possesses a triple spring rate over a range of deflection. It should be noted that gap $g_o$ may be made to close before gap $g_i$ by suitable dimensioning of the resilient inner and outer bushings with respect to the mounting ring.

It is to be understood that the foregoing description is merely illustrative of a preferred embodiment of the invention, and that the scope of the invention is not to be limited thereto, but is to be determined by the scope of the appended claims.

What is claimed is:

1. In an isolation mount for absorbing shock loading including a stub shaft, mounting means providing at least a double spring rate including a first spring rate from substantially zero deflection to a first deflection limit and a second spring rate from said first deflection limit to a second deflection limit, said second spring rate being higher than said first spring rate, said second deflection limit being greater than said first deflection limit, wherein said mounting means comprises annular inner and outer bushings, said inner bushing having a diameter less than the diameter of said outer bushing and defining an annular space therebetween, said outer bushing having a radially inner face and said inner bushing having a radially outer face which define the radial limits of said space, an annular mounting ring intermediate said faces, said mounting ring defining a radially outer portion being generally axially directed, and a pair of generally axially directed radially inner portions on opposite sides of said radially outer portion, said outer and inner portions being connected by a pair of generally radially directed side walls, and further including a pair of annular, resilient outer bushing members intermediate said inner portions and said radially inner face, and an inner resilient bushing member intermediate said outer portion and said radially outer face, and wherein said outer portion is spaced from said inner face by an outer gap.

2. The invention of claim 1 wherein said mounting means provides a triple spring rate and further including a third spring rate above said second deflection limit, and wherein said third spring rate is higher than said second spring rate.

3. The invention of claim 2 wherein said first, second and thrid spring rates are substantially linear throughout their deflection range.

4. The invention of claim 1 wherein said resilient bushing members are sized with respect to each other so that a radial load imparted on said bushing members will cause one of said gaps to close before the other of said gaps whereby the spring rate contribution of said outer bushings changes abruptly with respect to the spring rate contribution of said inner bushings.

5. The invention of claim 1 wherein said annular mounting ring is sized with respect to said bushing members so that a radial load imparted on said bushing members will cause one of said gaps to close before the other of said gaps whereby the spring rate contribution of said outer bushings changes with respect to the spring rate contribution of said inner bushings.

6. The invention of claim 1 wherein the material of said resilient bushings is rubber.

7. The invention of claim 1 wherein said inner ring is of metal material.

8. The invention of claim 1 wherein said inner ring is of sheet metal material.

9. The invention of claim 1 wherein said outer bushings are bonded to said inner face and said inner portion and said inner bushing is bonded to said outer face and said outer bushing.

* * * * *

Disclaimer 4,044,977.—*Dennis D. Feucht*, Morton, Ill. BUSHING TYPE MOUNT WITH TRIPLE SPRING RATE. Patent dated Aug. 30, 1977. Disclaimer filed Aug. 20, 1982, by the assignee, *Caterpillar Tractor Co.*

Hereby enters this disclaimer to claims 1 through 9 of said patent.

[*Official Gazette October 5, 1982.*]